July 27, 1954  S. G. BLUMENSAADT  2,684,705
FEEDING MECHANISM FOR POWER PRESS BRAKES
Filed Aug. 31, 1950  3 Sheets-Sheet 2
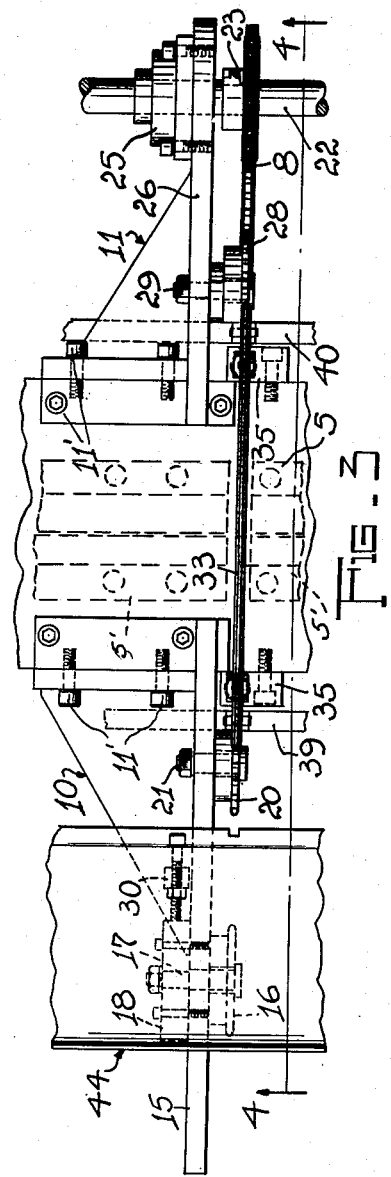
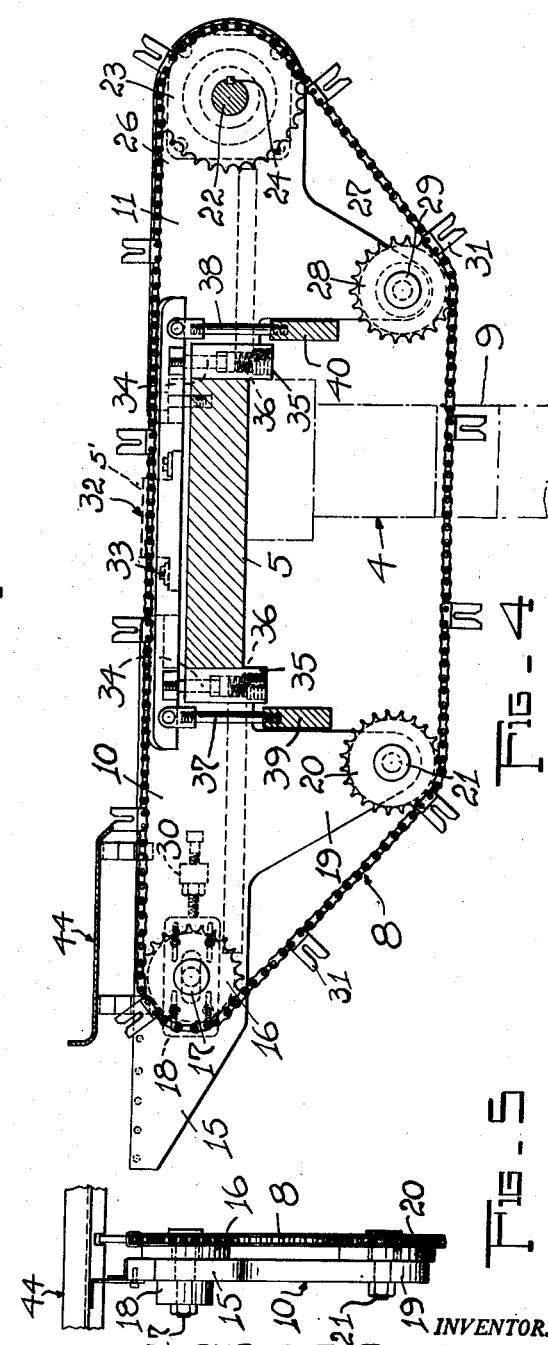
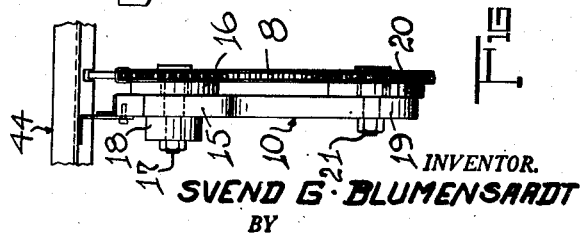
INVENTOR.
SVEND G. BLUMENSAADT
BY
ATT.

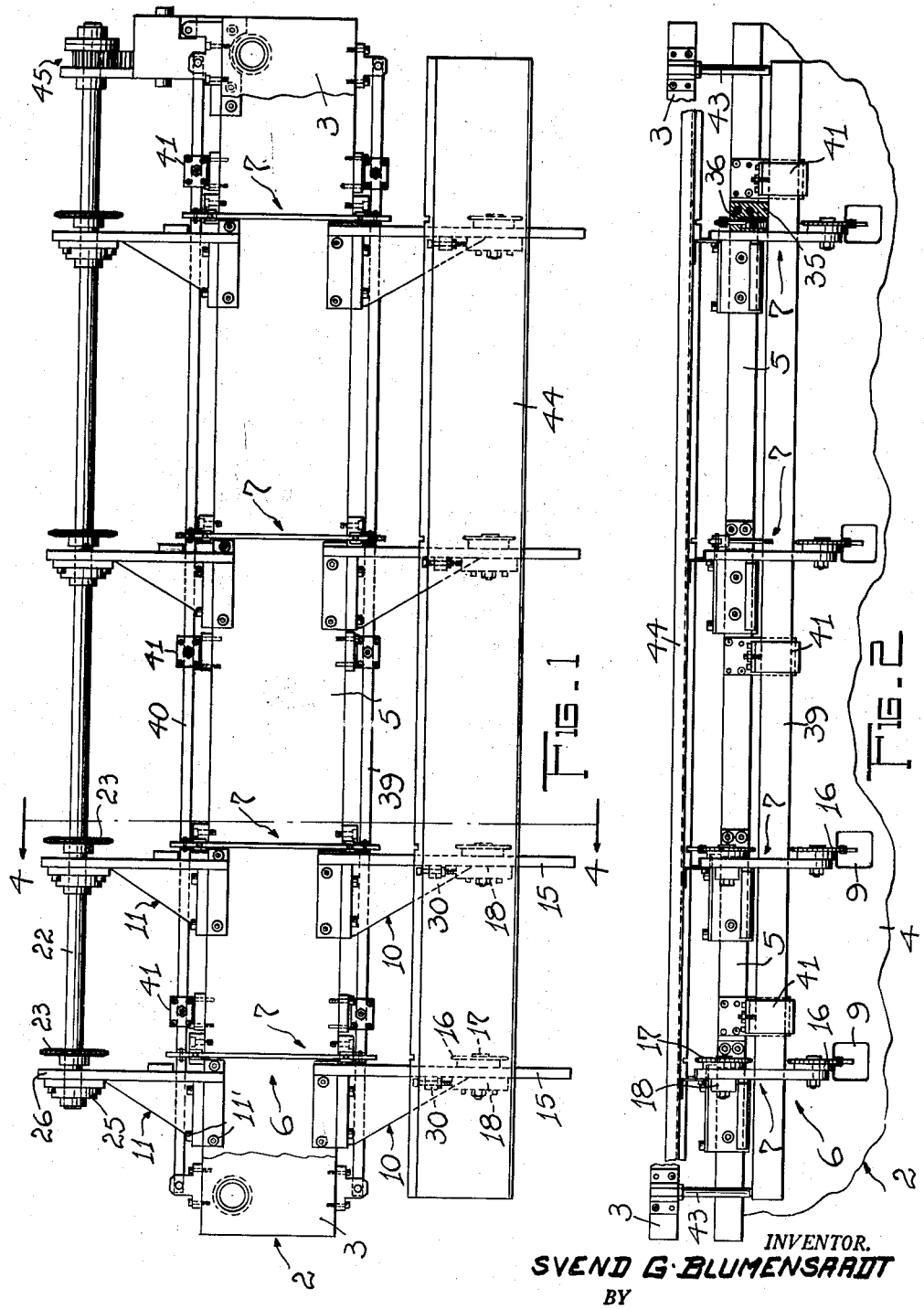

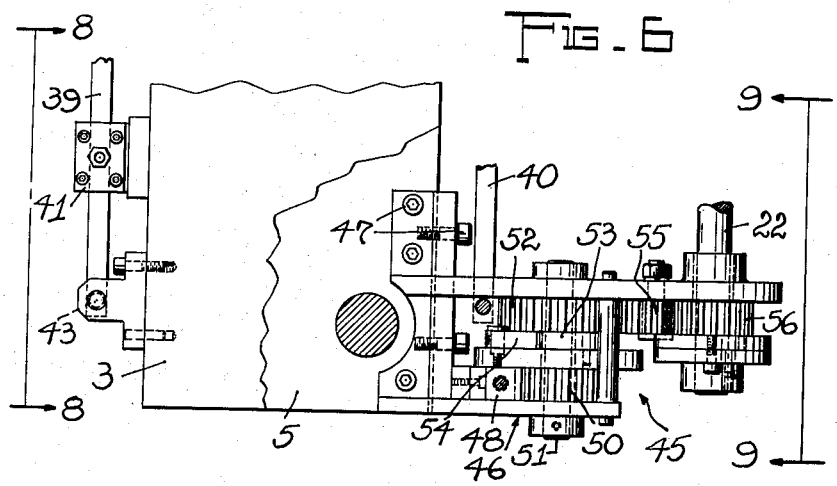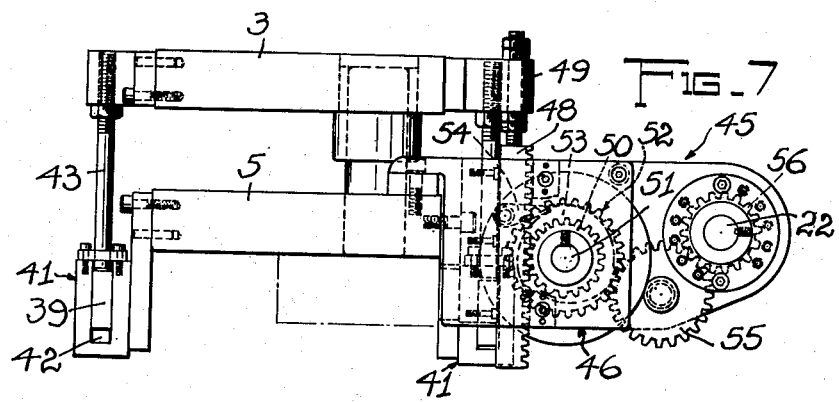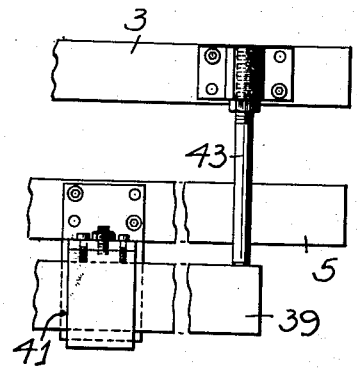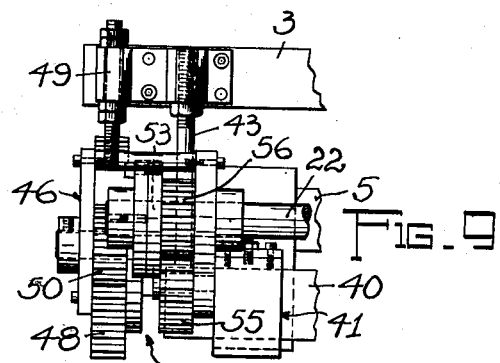

Patented July 27, 1954

2,684,705

UNITED STATES PATENT OFFICE 2,684,705

FEEDING MECHANISM FOR POWER PRESS BRAKES

Svend G. Blumensaadt, Beachwood Village, Ohio, assignor to The Universal Wire Spring Company, Cleveland, Ohio, a corporation of Ohio Application August 31, 1950, Serial No. 182,449

6 Claims. (Cl. 153—21)

This invention relates in general to mechanism for feeding material to power presses and, more particularly, to chain conveyor mechanism for power press brakes suitable for feeding elongated strips of material to and between the dies of power press brakes.

The primary object of the present invention is the provision of a chain conveyor mechanism constructed to be mounted on the bed of a power press brake or the bolster plate of a die structure secured to the bed, the mechanism including endless conveyor chains supported and guided by vertically shiftable guide means arranged between the bed and the reciprocating ram of the power press brake to permit guiding of the endless conveyor chains of the mechanism through the power press brake between the dies of a die structure mounted thereon and proper positioning of the material with respect to the dies for unimpeded forming, notching and pressing of material by the dies.

Another object of the invention is the provision of a chain conveyor mechanism constructed to be mounted on the bed of a power press brake or the bolster plate of a die structure secured to the bed, the mechanism including endless conveyor chains and spring supported, vertically shiftable guide means arranged between the bed and the reciprocating ram of the power press brake to permit guiding of the endless conveyor chains of the mechanism through the power press brake between the dies of a die structure mounted thereon and proper positioning of the material with respect to the dies for unimpeded forming, notching and pressing of material by the dies.

A further object of the invention is the provision of a chain conveyor mechanism constructed to be mounted on the bed of a power press brake or the bolster plate of a die structure secured to the bed, the mechanism including endless conveyor chains; vertically shiftable, spring supported guide means between the bed and the reciprocating ram of the power press brake permitting guiding of the material carrying portions of the endless conveyor chains through the power press brake in feeding material to the dies and proper positioning of the material with respect to the dies for unimpeded forming, notching and pressing of the material by the dies, and driving mechanism for the conveyor chains coupled with the reciprocating ram of the power press brake for intermittent shifting of the conveyor chains during the upward movement of the reciprocating ram of the power press brake.

In addition, the invention has other marked improvements and superiorities which radically distinguish it from presently known structures. These improvements and superior characteristics, embodying the above novel features of construction and other more limited novel features, are clearly set forth in the appended claims and the preferred embodiment of the invention hereinafter shown with reference to the accompanying drawings forming part of the specification.

In the drawings:

Fig. 1 is a plan view of a chain conveyor mechanism constructed in accordance with the invention, the mechanism shown without conveyor chains being attached to the bolster plate of the lower die assembly of a die structure;

Fig. 2 is a front view of Fig. 1;

Fig. 3 is an enlarged fragmentary plan view of one of the conveyor units of the chain conveyor mechanism;

Fig. 4 is an enlarged cross sectional view taken on line 4—4 of Fig. 1, the view being shown with a conveyor chain;

Fig. 5 is a front view of Fig. 4;

Fig. 6 is a plan view partly in section of the gearing and drive arrangement for the driven shaft of the conveyor units;

Fig. 7 is an end view of the gearing and drive arrangement shown in Fig. 6;

Fig. 8 is a fragmentary front view of the right end portion of the chain conveyor mechanism, the view being taken from line 8—8 in Fig. 6; and Fig. 9 is a fragmentary view of the right end portion of the chain conveyor mechanism, the view being taken from line 9—9 in Fig. 6.

Referring now more in detail to the exemplified form of the invention shown in the drawings, reference numeral 2 denotes a press brake having attached to its reciprocating ram (not shown) a top bolster plate 3 and to its stationary base or bed 4 a bottom bolster plate 5, which bolster plates, as customary, mount die blocks 5' and form with the bolster plate the die members to be used in forming and shaping material in the press brake.

Lower bolster plate 5 mounts an intermittent feeding mechanism 6 coupled with and actuated by the reciprocatory movements of the ram of the press brake. This feeding mechanism embodies a plurality of laterally spaced conveyor units 7 which include endless conveyor chains 8 arranged to pass freely through openings 9 in bed 4, the space between bed 4 and the ram of the press brake and the spaces between adjacent die blocks 5' to completely encircle lower bolster plate 5. Each conveyor unit 7 embodies two oppositely arranged brackets, a front bracket 10 and a rear bracket 11, which brackets are secured to lower bolster plate 5 by screws 11' and extend laterally from the front and rear side faces 12 and 14 of said bolster plate. The front bracket 10 has adjustably mounted on its upper side portion 15 an idler sprocket wheel 16 which is journaled on a stud shaft 17 arranged in a bearing member 18 laterally adjustably supported by said bracket, and, in addition, has freely rotatably supported on a downward extension 19 a second idler sprocket wheel 20 arranged in the plane of idler sprocket wheel 16 and journaled on a stud shaft 21 secured to extension 19. The rear bracket 11 has mounted on a driven shaft 22 a sprocket drive wheel 23 which is keyed to said shaft by a key member 24. Driven shaft 22 is freely rotatably mounted in bearing 25 secured to the upper side portion 26 of rear bracket 11 which, in addition, has freely rotatably supported on a downward extension 27 a second idler sprocket wheel 28 arranged in the plane of sprocket drive wheel 23 and journaled on a stud shaft 29 secured to extension 27. The front and rear brackets of a conveyor unit are opposed to each other so that all sprocket wheels of the conveyor unit are arranged in the same plane to properly mount and support the endless conveyor chain 8 of the unit and permit its proper tensioning by lateral adjustment of bearing member 18, a shifting screw arrangement 30 mounted on front bracket 10 adjacent to bearing member 18 being used for this purpose. Sprocket chain 8 also includes a plurality of spaced fingers 31 adapted to carry the material to and through the press brake.

Mounting of endless sprocket chain 8 on driving and idler sprocket wheels in the manner described gives such chain trapezoid-like configuration having upper material-carrying portion 32 extended crosswise of lower bolster plate 5 in slightly spaced relation with respect thereto between the die blocks 5' mounted thereon. The material carrying portion 32 of sprocket chain 8 is guided and supported by a guide bar 33 which extends crosswise of bolster plate 5 and is supported by rod members 34 slidably mounted in blocks 35 and yieldingly forced upwardly by springs 36 in said blocks. The guide bar 33 additionally has extended from its opposite end portions shifting rods 37, 38 which connect the guide bar with two trip bars 39, 40, respectively, to permit positive downward shifting of guide bar 33 when the reciprocating ram of the press brake is moving downwardly. These trip bars are guided in bar brackets 41 secured to the bottom bolster plate 5, which brackets include vertically elongated slots 42 permitting vertical downward shifting of the trip bars in said brackets when trip rods 43 attached to top bolster plate 3 contact these trip bars on the downward stroke of the ram of the press brake. The downward movement of guide bar 33 permits proper positioning of the material on the die blocks 5' mounted on bottom bolster plate 5 and thus insures proper forming and shaping of such material by the dies of the press brake.

The thus described chain conveyor mechanism which includes four of the conveyor units described above, and which mounts on its front brackets 10 a loader plate 44 to permit feeding of material to the fingers 31 of conveyor chains 8, actuated by gear mechanism 45 arranged in driving connection with driven shaft 22. The housing 46 of this gear mechanism is secured to the rear side of bottom bolster plate 5 by screws 47 and mounts a rack and pinion drive having its rack bar 48 adjustably secured to the top bolster plate 3 by a bracket 49 and its rack gear or pinion 50 secured to a shaft 51 journaled in housing 46. Shaft 51 freely rotatably supports a gear 52 and a ratchet gear 53 keyed to gear 52, which ratchet gear is coupled with rack gear 50 for rotation in one direction only by a pawl 54 mounted on rack gear 50. Gear 52 meshes an idler gear 55, in turn meshing a gear 56 which is keyed to driven shaft 22.

In operation the conveyor chains of the chain conveyor mechanism are intermittently advanced by upward movement of the reciprocating ram of the press brake. Thus upward movement of the ram effects clockwise rotation of rack gear 50 and ratchet gear 53 coupled with said rack gear by pawl 54 (see Fig. 7). Clockwise rotation of ratchet gear 53 is directly transferred to gear 52 keyed to said ratchet gear so that gear 52 also rotates clockwise and by its coupling with gear 56 over idler gear 55 effects a clockwise rotation of gear 56 and the driven shaft 22 keyed thereto, which driven shaft 22 mounts sprocket drive wheels 23 of the conveyor units 7 and thus effects advancing of endless conveyor chains 8. Downward movement of the ram effects an anti-clockwise rotation of the rack gear 50 which when so rotated is not coupled with ratchet gear 53 as pawl 54 is not in driving engagement with the ratchet teeth of the ratchet gear 53, so that a downward movement of the ram does not advance the conveyor chains of the mechanism. During such downward movement of the ram the trip bars 39, 40 are engaged by trip rods 43 attached to the ram and yieldingly shift the guide bars 33 downwardly between the die blocks 5' to permit downward shifting of the material-carrying portions 32 of the conveyor chains and therewith proper positioning and locating of such material on the die blocks 5' mounted on bolster plate 5.

Having thus described my invention what I claim is:

1. In feeding mechanism for power press brakes a plurality of chain conveyor units adapted to be attached in laterally spaced, parallel relation to the bed of a power press brake lengthwise thereof, each of said units having an endless conveyor chain including an upper, substantially straight, feeding portion arranged to extend at a right angle through said power press brake above its bed and below its ram, and each of said conveyor chains being arranged to completely encircle the bolster plate of a die structure mounted on the bed of the power press brake by extending the feeding portions of the conveyor chains between the die blocks mounted on the bolster plate of such die structure, a drive shaft for said conveyor chains coupled therewith, and drive gearing for said drive shaft coupled therewith and the ram of the power press brake, said drive gearing including one-way clutch means adapted to effect intermittent movements of the conveyor chains by reciprocatory movements of said ram.

2. In feeding mechanism for power press brakes a plurality of chain conveyor units adapted to be attached in laterally spaced, parallel relation to the bed of a power press brake lengthwise thereof, each of said units having an endless conveyor chain including an upper substantially straight, vertically-shiftable, material-carrying portion arranged to extend at a right angle through said power press brake above its bed and below its ram, and each of said conveyor chains arranged to completely encircle the bolster plate of a die mounted on the bed of the power press brake by extending the material carrying portion of such conveyor chain between the die blocks mounted on the bolster plate of the die structure, shiftable supporting means below the material carrying portion of such conveyor chain to support same, a single drive shaft coupled with said conveyor chains, drive gearing for said drive shaft including a one-way clutch, and shifting means for said shiftable supporting means and said drive gearing attached to the ram of the power press brake adapted to effect shifting of the material-carrying portion of a conveyor chain and intermittent rotation of the drive shaft when the ram of the power press brake is reciprocated.

3. A feeding mechanism as described in claim 2, wherein the shiftable supporting means for the vertically-shiftable, material-carrying portions of the conveyor chains consists of vertically-shiftable guide bars, and wherein said guide bars are mounted on axially-shiftable, spring-supported bar members.

4. A feeding mechanism as described in claim 2, wherein the shiftable supporting means for the vertically-shiftable, material-carrying portions of the conveyor chains consist of horizontally-arranged, vertically-shiftable guide bars, wherein said guide bars are supported near their opposite ends by vertical, axially-shiftable, spring-supported bar members, and wherein said guide bars support horizontally arranged trip bars arranged lengthwise of said feeding mechanism for cooperation with the said shifting means in vertically shifting said guide bars.

5. The combination of a power press brake and a feeding mechanism attached thereto, comprising a power press brake, a plurality of chain conveyor units mounted on the power press brake in laterally spaced relation lengthwise thereof, said chain conveyor units including endless conveyor chains having horizontally arranged chain sections extended through the power press brake between its bed and ram and the die blocks of a die structure mounted on the bed so as to encircle the bolster plate of such die structure, spring actuated, vertically shiftable supporting means for the chain sections permitting in stamping procedures downward shifting of the chain sections for unimpeded die operations, a shaft means for driving the conveyor chains, and gearing means coupled with said shaft means and the power press brake to effect intermittent driving of the conveyor chains by reciprocatory movements of the power press brake.

6. The combination of a power press brake and a feeding mechanism attached thereto, comprising a power press brake, a plurality of chain conveyor units mounted on the power press brake in laterally spaced relation lengthwise thereof, said chain conveyor units including endless conveyor chains passing at right angles through said power press brake above its bed and below its ram and extending between the die blocks of a die structure mounted on the bed so as to encircle the bolster plate of such die structure, a drive shaft for said conveyor units arranged to extend parallel to the longitudinal axis of the power press brake, and gearing coupled with said drive shaft and adapted to be coupled with the ram of such power press brake for actuating said units by the reciprocatory movements of said ram, said gearing including one way clutch means for actuating said drive shaft intermittently.

References Cited in the file of this patent

UNITED STATES PATENTS

| Number | Name | Date |
|---|---|---|
| 413,667 | Hodgson | Oct. 29, 1889 |
| 1,274,208 | Stowe | July 30, 1918 |
| 1,348,806 | Kessen | Aug. 3, 1920 |